(12) United States Patent  
Reinders et al.

(10) Patent No.: US 9,286,643 B2  
(45) Date of Patent: Mar. 15, 2016

(54) PERSONALIZED MEMORY COMPILATION FOR MEMBERS OF A GROUP AND COLLABORATIVE METHOD TO BUILD A MEMORY COMPILATION

(75) Inventors: Robert R. Reinders, Cincinnati, OH (US); Christopher Romano, Cincinnati, OH (US)

(73) Assignee: Applaud, LLC, Cincinnati, OH (US)

(*) Notice: Subject to any disclaimer, the term of this patent is extended or adjusted under 35 U.S.C. 154(b) by 0 days.

(21) Appl. No.: 13/406,530

(22) Filed: Feb. 28, 2012

(65) Prior Publication Data

US 2013/0061135 A1 Mar. 7, 2013

Related U.S. Application Data

(60) Provisional application No. 61/447,899, filed on Mar. 1, 2011.

(51) Int. Cl.
| | |
|---|---|
| G06F 17/00 | (2006.01) |
| G06Q 50/00 | (2012.01) |
| G06F 17/30 | (2006.01) |

(52) U.S. Cl.
CPC .......... *G06Q 50/01* (2013.01); *G06F 17/30867* (2013.01)

(58) Field of Classification Search
CPC ............ G06F 17/211; G06F 17/30056; G06F 17/30867; G06Q 50/01
USPC .................................. 715/201, 202, 203, 255
See application file for complete search history.

(56) References Cited

U.S. PATENT DOCUMENTS

| | | | |
|---|---|---|---|
| 3,898,617 A | 8/1975 | Kashioka et al. | |
| 3,982,744 A | 9/1976 | Kraynak et al. | |

(Continued)

FOREIGN PATENT DOCUMENTS

| | | |
|---|---|---|
| AR | 040044 | 3/2005 |
| CN | 203908912 U | 10/2014 |

(Continued)

OTHER PUBLICATIONS

Alzheimer's Association, 2012 Alzheimer's Disease Facts and Figures, Mar. 2012, 2 pgs, downloaded from http://www.alz.org/documents_custom/2012_facts_figures_fact_sheet.pdf.

(Continued)

*Primary Examiner* — Laurie Ries  
(74) *Attorney, Agent, or Firm* — Frost Brown Todd LLC

(57) ABSTRACT

The present invention may provide a method and apparatus for building a personalized memory compilation for members of a group: providing digitally encoded images, text and other data; analyzing data; eliciting a characteristic of data; selecting a plurality of the provided data; arranging the provided data, to generate a personalized memory compilation; wherein at least one of a selecting or an arranging step is performed in response to elicited characteristics. The invention may comprise a collaborative method and apparatus for gathering, enriching, preserving, and sharing memories for members of a group using the combination of 1) collaboration through nominal group recall and 2) recording of personal preferences to produce a digital asset that contains a unique blend of selected profiles, images, stories, personalized notes, and other relevant content from more than one group member to constitute a more complete and accurate rendering of an important occasion experienced by the group.

12 Claims, 5 Drawing Sheets

(56) References Cited

U.S. PATENT DOCUMENTS

| | | | |
|---|---|---|---|
| 4,281,312 | A | 7/1981 | Knudson |
| 4,805,327 | A * | 2/1989 | Buckley .................. 40/735 |
| 4,831,659 | A | 5/1989 | Miyaoka et al. |
| 4,837,447 | A | 6/1989 | Pierce et al. |
| 4,933,740 | A | 6/1990 | Baliga et al. |
| 4,941,193 | A | 7/1990 | Barnsley et al. |
| 5,065,447 | A | 11/1991 | Barnsley et al. |
| 5,262,878 | A | 11/1993 | Esserman |
| 5,271,071 | A | 12/1993 | Waite |
| 5,274,466 | A | 12/1993 | Ida et al. |
| 5,321,776 | A | 6/1994 | Shapiro |
| 5,343,539 | A | 8/1994 | Chan |
| 5,347,600 | A | 9/1994 | Barnsley et al. |
| 5,384,867 | A | 1/1995 | Barnsley et al. |
| 5,396,228 | A | 3/1995 | Masood |
| 5,410,617 | A | 4/1995 | Kidd et al. |
| 5,416,604 | A | 5/1995 | Park |
| 5,416,856 | A | 5/1995 | Jacobs et al. |
| 5,420,967 | A | 5/1995 | Delp |
| 5,426,594 | A | 6/1995 | Wright et al. |
| 5,430,812 | A | 7/1995 | Barnsley et al. |
| 5,497,435 | A | 3/1996 | Berger |
| 5,502,439 | A | 3/1996 | Berlin |
| 5,510,838 | A | 4/1996 | Yomdin et al. |
| 5,513,128 | A | 4/1996 | Rao |
| 5,577,183 | A | 11/1996 | Weyand |
| 5,600,373 | A | 2/1997 | Chui et al. |
| 5,610,657 | A | 3/1997 | Zhang |
| 5,701,369 | A | 12/1997 | Moon et al. |
| 5,717,788 | A | 2/1998 | Barnsley |
| 5,721,543 | A | 2/1998 | Johnson et al. |
| 5,729,607 | A | 3/1998 | Defries et al. |
| 5,732,158 | A | 3/1998 | Jaenisch |
| 5,740,282 | A | 4/1998 | Hurd |
| 5,754,702 | A | 5/1998 | Simpson |
| 5,754,704 | A | 5/1998 | Barnsley et al. |
| 5,787,201 | A | 7/1998 | Nelson et al. |
| 5,809,169 | A | 9/1998 | Rezzouk et al. |
| 5,822,721 | A | 10/1998 | Johnson et al. |
| 5,838,820 | A | 11/1998 | Bergman |
| 5,838,832 | A | 11/1998 | Barnsley |
| 5,838,833 | A | 11/1998 | Ishikawa et al. |
| 5,848,177 | A | 12/1998 | Bauer et al. |
| 5,848,198 | A | 12/1998 | Penn |
| 5,859,935 | A | 1/1999 | Johnson et al. |
| 5,862,262 | A | 1/1999 | Jacobs et al. |
| 5,862,263 | A | 1/1999 | Kim et al. |
| 5,862,264 | A | 1/1999 | Ishikawa et al. |
| 5,867,386 | A | 2/1999 | Hoffberg et al. |
| 5,867,603 | A | 2/1999 | Barnsley et al. |
| 5,870,502 | A | 2/1999 | Bonneau et al. |
| 5,875,108 | A | 2/1999 | Hoffberg et al. |
| 5,901,246 | A | 5/1999 | Hoffberg et al. |
| 5,917,962 | A | 6/1999 | Chen et al. |
| 5,920,477 | A | 7/1999 | Hoffberg et al. |
| 5,924,053 | A | 7/1999 | Horowitz et al. |
| 5,946,417 | A | 8/1999 | Bonneau et al. |
| 5,974,188 | A | 10/1999 | Ibenthal |
| 6,001,889 | A | 12/1999 | Lefebvre |
| 6,004,061 | A | 12/1999 | Manico et al. |
| 6,076,088 | A * | 6/2000 | Paik et al. .................. 1/1 |
| 6,081,750 | A | 6/2000 | Hoffberg et al. |
| 6,092,049 | A | 7/2000 | Chislenko et al. |
| 6,104,834 | A | 8/2000 | Hull |
| 6,111,988 | A | 8/2000 | Horowitz et al. |
| 6,125,143 | A | 9/2000 | Suzuki et al. |
| 6,198,851 | B1 | 3/2001 | Kato et al. |
| 6,229,931 | B1 | 5/2001 | Essafi et al. |
| 6,266,451 | B1 | 7/2001 | Charrier et al. |
| 6,285,794 | B1 | 9/2001 | Georgiev et al. |
| 6,307,948 | B1 | 10/2001 | Kawasaki et al. |
| 6,321,231 | B1 | 11/2001 | Jebens et al. |
| 6,324,545 | B1 | 11/2001 | Morag |
| 6,332,146 | B1 | 12/2001 | Jebens et al. |
| 6,339,659 | B1 | 1/2002 | Fukuhara et al. |
| 6,356,667 | B1 | 3/2002 | Fukuhara |
| 6,373,989 | B1 | 4/2002 | Fukuhara et al. |
| 6,400,996 | B1 | 6/2002 | Hoffberg et al. |
| 6,418,424 | B1 | 7/2002 | Hoffberg et al. |
| 6,456,743 | B1 | 9/2002 | Charrier et al. |
| 6,476,766 | B1 | 11/2002 | Cohen |
| 6,480,541 | B1 | 11/2002 | Girod et al. |
| 6,498,866 | B2 | 12/2002 | Charrier et al. |
| 6,501,862 | B1 | 12/2002 | Fukuhara et al. |
| 6,502,045 | B1 | 12/2002 | Biagiotti |
| 6,526,178 | B1 | 2/2003 | Fukuhara |
| 6,546,136 | B1 | 4/2003 | Hull |
| 6,556,719 | B1 | 4/2003 | Monro |
| 6,562,171 | B1 | 5/2003 | Archie, Jr. et al. |
| 6,633,682 | B1 | 10/2003 | Perlin |
| 6,640,145 | B2 | 10/2003 | Hoffberg et al. |
| 6,661,904 | B1 | 12/2003 | Sasich et al. |
| 6,674,875 | B1 | 1/2004 | Phillips et al. |
| 6,707,484 | B1 | 3/2004 | Kawasaki et al. |
| 6,714,145 | B1 | 3/2004 | Marques |
| 6,721,713 | B1 * | 4/2004 | Guheen et al. .................. 705/1.1 |
| 6,738,520 | B1 | 5/2004 | Acharya et al. |
| 6,742,924 | B2 | 6/2004 | Kearney |
| 6,775,411 | B2 | 8/2004 | Sloan et al. |
| 6,906,719 | B2 | 6/2005 | Chadha et al. |
| 6,928,397 | B1 | 8/2005 | Matsushiro |
| 6,950,198 | B1 | 9/2005 | Berarducci et al. |
| 7,046,728 | B1 | 5/2006 | Acharya et al. |
| 7,046,862 | B2 | 5/2006 | Ishizaka et al. |
| 7,061,491 | B2 | 6/2006 | Happel |
| 7,075,986 | B2 | 7/2006 | Girod et al. |
| 7,101,434 | B2 | 9/2006 | Ugajin |
| 7,110,547 | B2 | 9/2006 | Short |
| 7,110,613 | B2 | 9/2006 | Muramatsu et al. |
| 7,148,990 | B2 | 12/2006 | Atkins et al. |
| 7,209,885 | B1 | 4/2007 | Shono et al. |
| 7,215,772 | B2 | 5/2007 | Short |
| 7,215,776 | B1 | 5/2007 | Short |
| 7,218,772 | B2 | 5/2007 | Gleason et al. |
| 7,242,988 | B1 | 7/2007 | Hoffberg et al. |
| 7,286,670 | B2 | 10/2007 | Short |
| 7,287,225 | B2 | 10/2007 | Mindrum |
| 7,339,597 | B1 * | 3/2008 | Bourdev et al. .................. 345/619 |
| 7,373,302 | B1 | 5/2008 | Jastrebski et al. |
| 7,440,570 | B2 | 10/2008 | Short |
| 7,454,163 | B2 | 11/2008 | Kasahara et al. |
| 7,469,237 | B2 | 12/2008 | Cooper |
| 7,474,801 | B2 | 1/2009 | Teo et al. |
| 7,480,415 | B2 | 1/2009 | Nicolai et al. |
| 7,487,155 | B2 | 2/2009 | Jebens et al. |
| 7,508,325 | B2 | 3/2009 | Monro |
| 7,511,638 | B2 | 3/2009 | Monro |
| 7,511,639 | B2 | 3/2009 | Monro |
| 7,525,680 | B2 | 4/2009 | Berarducci et al. |
| 7,526,137 | B2 | 4/2009 | Ishizaka |
| 7,545,291 | B2 | 6/2009 | Monro |
| 7,548,176 | B2 | 6/2009 | Monro |
| 7,586,424 | B2 | 9/2009 | Monro |
| 7,602,316 | B2 | 10/2009 | Monro |
| 7,614,837 | B2 | 11/2009 | Anderson et al. |
| 7,663,671 | B2 * | 2/2010 | Gallagher et al. .......... 348/231.2 |
| 7,671,767 | B2 | 3/2010 | Monro |
| 7,672,484 | B2 | 3/2010 | Wiedemann et al. |
| 7,676,065 | B2 | 3/2010 | Wiedemann et al. |
| 7,689,049 | B2 | 3/2010 | Monro |
| 7,689,620 | B2 | 3/2010 | Tan |
| 7,707,213 | B2 | 4/2010 | Monro |
| 7,707,214 | B2 | 4/2010 | Monro |
| 7,728,740 | B2 | 6/2010 | Monro |
| 7,737,869 | B2 | 6/2010 | Monro |
| 7,738,707 | B2 | 6/2010 | Wiedemann et al. |
| 7,760,868 | B2 | 7/2010 | Kawasaki et al. |
| 7,770,091 | B2 | 8/2010 | Monro |
| 7,774,431 | B2 | 8/2010 | Conn et al. |
| 7,783,079 | B2 | 8/2010 | Monro |
| 7,786,903 | B2 | 8/2010 | Monro |
| 7,786,907 | B2 | 8/2010 | Monro |
| D623,193 | S | 9/2010 | Cameron et al. |
| 7,791,513 | B2 | 9/2010 | Monro |

(56) References Cited

U.S. PATENT DOCUMENTS

| | | | |
|---|---|---|---|
| 7,809,206 | B2 | 10/2010 | Ishizaka |
| 7,810,037 | B1* | 10/2010 | Edwards et al. ............. 715/749 |
| 7,813,573 | B2 | 10/2010 | Monro |
| 7,843,367 | B2 | 11/2010 | Monro |
| 7,845,571 | B2 | 12/2010 | Monro |
| 7,848,584 | B2 | 12/2010 | Monro |
| 7,864,086 | B2 | 1/2011 | Monro |
| 7,894,675 | B2 | 2/2011 | Wiedemann et al. |
| D634,330 | S | 3/2011 | Brown |
| D634,331 | S | 3/2011 | Brown |
| 7,904,922 | B1* | 3/2011 | Haberman et al. ............. 725/35 |
| 7,907,068 | B2 | 3/2011 | Monro |
| D639,304 | S | 6/2011 | Fujii et al. |
| 7,974,488 | B2 | 7/2011 | Monro |
| 7,974,714 | B2 | 7/2011 | Hoffberg |
| 7,983,446 | B2 | 7/2011 | Wiedemann et al. |
| 7,990,289 | B2 | 8/2011 | Monro |
| 8,285,084 | B2* | 10/2012 | Yoda ............................. 382/305 |
| 8,396,297 | B2 | 3/2013 | Panda |
| 8,841,451 | B2 | 9/2014 | Newkome et al. |
| 8,965,136 | B2 | 2/2015 | Jaffe et al. |
| 2001/0041020 | A1* | 11/2001 | Shaffer et al. ................ 382/305 |
| 2002/0001102 | A1 | 1/2002 | Williams |
| 2002/0049783 | A1* | 4/2002 | Berk ...................... G06Q 30/02 715/202 |
| 2003/0069732 | A1* | 4/2003 | Stephany et al. ............. 704/270 |
| 2003/0072486 | A1* | 4/2003 | Loui et al. .................... 382/175 |
| 2003/0151310 | A1 | 8/2003 | Yu |
| 2003/0182246 | A1 | 9/2003 | Johnson et al. |
| 2004/0051295 | A1* | 3/2004 | Gross et al. ................. 281/15.1 |
| 2004/0267816 | A1* | 12/2004 | Russek ....................... 707/104.1 |
| 2005/0033623 | A1 | 2/2005 | Zemborain |
| 2005/0196735 | A1 | 9/2005 | Buschke |
| 2005/0198056 | A1* | 9/2005 | Dumais et al. ................ 707/101 |
| 2006/0041632 | A1* | 2/2006 | Shah et al. .................... 709/217 |
| 2006/0109516 | A1 | 5/2006 | Catalan et al. |
| 2006/0293921 | A1* | 12/2006 | McCarthy et al. ................ 705/2 |
| 2007/0078849 | A1* | 4/2007 | Slothouber ........................ 707/5 |
| 2007/0124282 | A1* | 5/2007 | Wittkotter .......................... 707/3 |
| 2008/0068665 | A1 | 3/2008 | Niblett et al. |
| 2008/0163118 | A1* | 7/2008 | Wolf .............................. 715/835 |
| 2008/0263053 | A1* | 10/2008 | Hull ................................ 707/10 |
| 2008/0313214 | A1* | 12/2008 | Duhig et al. .................... 707/102 |
| 2009/0019348 | A1 | 1/2009 | King |
| 2009/0063557 | A1* | 3/2009 | MacPherson ............ 707/103 R |
| 2009/0171902 | A1* | 7/2009 | MacLaurin ............. G06Q 10/10 |
| 2009/0313267 | A1* | 12/2009 | Girgensohn et al. .......... 707/100 |
| 2010/0042915 | A1* | 2/2010 | Ohara et al. ................... 715/243 |
| 2010/0046842 | A1* | 2/2010 | Conwell ....................... 382/218 |
| 2010/0138749 | A1* | 6/2010 | Covannon et al. ............. 715/733 |
| 2010/0161541 | A1* | 6/2010 | Covannon ......... G06F 17/30032 706/47 |
| 2010/0199227 | A1* | 8/2010 | Xiao ...................... G06F 3/0481 715/863 |
| 2010/0205541 | A1* | 8/2010 | Rapaport et al. .............. 715/753 |
| 2010/0235312 | A1* | 9/2010 | McCullough ..... G06F 17/30265 706/47 |
| 2010/0325558 | A1* | 12/2010 | Edwards et al. ............. 715/751 |
| 2011/0035678 | A1* | 2/2011 | Hamrick ........... G06F 17/30038 715/751 |
| 2011/0246945 | A1* | 10/2011 | Caine et al. ................... 715/835 |
| 2011/0264736 | A1* | 10/2011 | Zuckerberg et al. .......... 709/204 |
| 2011/0283172 | A1* | 11/2011 | Berger .................... G06Q 50/01 715/202 |
| 2012/0054589 | A1* | 3/2012 | Berger et al. ................. 715/202 |
| 2012/0158716 | A1* | 6/2012 | Zwol et al. .................... 707/728 |
| 2012/0197856 | A1* | 8/2012 | Banka et al. .................. 707/706 |
| 2012/0233273 | A1* | 9/2012 | Miner et al. ................... 709/206 |
| 2012/0246562 | A1* | 9/2012 | Maness et al. ................. 715/256 |
| 2012/0265758 | A1* | 10/2012 | Han ................... G06F 17/30038 707/737 |
| 2012/0284155 | A1* | 11/2012 | Holten et al. ................... 705/35 |
| 2012/0317111 | A1* | 12/2012 | Desmond et al. ............. 707/736 |
| 2013/0061135 | A1 | 3/2013 | Reinders et al. |
| 2013/0081036 | A1* | 3/2013 | Cohen et al. .................. 718/102 |
| 2013/0124980 | A1* | 5/2013 | Hudson et al. ................ 715/243 |
| 2014/0239446 | A1 | 8/2014 | Elshurafa et al. |
| 2014/0240894 | A1 | 8/2014 | Elshurafa et al. |

FOREIGN PATENT DOCUMENTS

| | | |
|---|---|---|
| EP | 2904887 A | 8/2015 |
| WO | WO 01/82231 | 11/2001 |
| WO | WO 2010/003003 A | 1/2010 |
| WO | WO 2012/034106 A | 3/2012 |
| WO | WO 2014/055573 | 4/2014 |

OTHER PUBLICATIONS

Applaud, "Personalized Memory Collection for Collaboration Reminiscence Therapy with Service Members Undergoing Rehabilitation for Traumatic Brain Injury", 2013.

Applaud, "Personalized Memory Collection for Collaborative Reminiscence Therapy with Service Members Undergoing Physical Rehabilitation", 2013.

Arrighi, H.M., et al., "Lethality of Alzheimer disease and its impact on nursing home placement", Alzheimer Dis Assoc Disord, 2010, vol. 24, pp. 90-95.

Baecker, R., et al., "Multimedia biographies for individuals with Alzheimer's disease and their families", University of Toronto Knowledge Media Design Institute and Baycrest MedNet, 2006, 3 pgs.

Barnier, A.J., et al., "From individual to collective memory: theoretical and empirical perspectives", Memory, 2008, vol. 16, Issue 3, pp. 177-182.

Bartz, J.A., et al., "The neuroscience of affiliation: Forging links between basic and.clinical research on neuropeptides and social behavior", Horm Beha, 2006, vol. 50, pp. 518-528.

Betts, K.R., et al., "Collaborative Group Memory: Processes, Performance, and Techniques for Improvement", Social and Personality Psychology Compass, Feb. 2010, vol. 4, Issue 2, pp. 119-130.

Boscarino, J.A., "Post-traumatic stress and associated disorders among vietnam veterans: The significance of combat exposure and social support", J Trauma Stress, 1995, vol. 8, pp. 317-336.

Burns, A., et al., "Cause of death in Alzheimer's disease", Age Ageing, 1990, vol. 19, pp. 341-344.

Cappa, S.F., et al., "EFNS guidelines on cognitive rehabilitation: report of an EFNS task Force", European Journal of Neurology, 2005, vol. 12, pp. 665-680.

Charnelian, L, et al. "The effect of major depression on subjective and objective cognitive deficits in mild to moderate traumatic brain injury", J Neuropsychiatry Clin Neurosci., 2006; vol. 18, pp. 33-38.

Charney, D.S., "Psychobiological mechanism of resilience and vulnerability: Implications for successful adaptation to extreme stress", Am J Psychiatr, 2004, vol. 161, pp. 195-216.

Cicerone, K.D., et al., "Evidence-Based Cognitive Rehabilitation: Updated Review of the Literature From 1998 through 2002", Archives of Physical Medicine and Rehabilitation (Elsevier), Aug. 2002, vol. 86, Issue 8, pp. 1681-1692.

Cifu, D.X., et al., "The Polytrauma Rehabilitation System of Care Programs at the Richmond Veterans Administration Medical Center", Crit Rev Phys Rehabil Med, 2009, vol. 21, Issue 3-4, pp. 197-213.

Clayton, K., et al. "Fractal Memory for Visual Form", Presented to the Society for Chaos Theory in Psychology and the Life Sciences, Berkley, CA, Jun. 1996.

Cohen, S., et al., "Social relationships and Health", *Am Psychol*, 2004, vol. 59, pp. 676-684.

Cohn-Kerr, N., "Understanding the process of adjustment to disability", Journal of Rehabilitation, 1961, vol. 27, pp. 16-18, Abstract Only.

Coleman, E.A, "Falling Through the Cracks: Challenges Improving Transitional Care for Persons with Continuous Complex Care Needs", J Am Geriatr Soc, 2003, vol. 51, pp. 549-555.

Cummings, J., et al., *Dementia, clinical approach*, 2nd ed. Jeffrey; International Journal of Geriatric Psychiatry, 1992, vol. 7, Issue 12, p. 920.

(56) References Cited

OTHER PUBLICATIONS

Dartmouth Undergraduate Journal of Science, "Stress Diagram", 2011, 1 pg, http://dujs.dartmouth.edu/wp-content/uploads/2011/02/stressdiagram.jpg, accessed Feb. 2, 2014.
Ditzen, B., et al., "Effects of different kinds of couple interaction on cortisol and heart rate responses to stress in women", Psychoneuroendocrinology, 2007, vol. 32, pp. 565-574.
Dobrez, D., et al., "Impact of mental disorders on cost and reimbursement for patients in inpatient rehabilitation facilities", Arch Phys Med Rehabil., 2010, vol. 91, pp. 184-188.
Ekeocha, J., et al., "Collaborative recall in face-to-face and electronic groups", Memory, 2008, vol. 16, Issue 3, pp. 245-261.
Fann, J.R., et al., "Psychiatric disorders and functional disability in outpatients with traumatic brain injuries", Am J Psychiatry., 1995, vol. 152, pp. 1493-1499.
Faul, M., et al., "Traumatic Brain Injury in the United States: Emergency Department Visits, Hospitalizations and Deaths 2002-2006", U.S. Department of Health and Human Services, Centers for Disease Control and Prevention, National Center for Injury Prevention and Control; Mar. 2010, 74 pgs. http://www.cdc.gov/traumaticbraininjury/pdf/blue book.pdf.
Ferri, C.P., et al., "Global prevalence of dementia: a Delphi consensus study", Lancet 2005, vol. 366, pp. 2112-2117.
Francis, P.T., et al., "Neurochemical studies of early-onset Alzheimer's disease: possible influence on treatment", N Engl J Med, 1985, vol. 313, pp. 7-11. Abstract only.
Fredrickson, B. L., et al., "What good are Positive Emotions in Crises? A prospective study of resilience and emotions following the terrorist attacks on the United States on Sep. 11th, 2001", Journal of Personality and Social Psychology, 2003, vol. 84, Issue 2, pp. 365-376.
Ganguli, M., et al., "Alzheimer Disease and Mortality: A 15-year Study", Arch Neurol, 2005, vol. 62, pp. 779-784.
Harris, C.B., et al., "Collaborative recall and collective memory: What happens when we remember together?", Memory, 2008, vol. 16, Issue 3, pp. 213-230.
Hebert, Le., et al., "Alzheimer disease in the U.S. population: Prevalence estimates using the 2000 Census", Archives of Neurology, 2003, vol. 60, No. 8, pp. 1119-1122.
Heinrichs, M. et al., "Social support and oxytocin interact to supress cortisol and subjective responses to psychosocial stress", Biol Psychiatry, 2003, vol. 54, pp. 1389-1398.
Heinrichs, M., et al., "Neuropeptides and social behavior: effects of oxytocin and vasopressin in humans", Prog Brain Res., 2008, vol. 170, pp. 337-350.
Hibbard, M.R., et al., "Axis I psychopathology in individuals with traumatic brain injury", J Head Trauma Rehabil., 1998, vol. 13, pp. 24-39.
Hirst, W., et al., "Towards a psychology of collective memory", Memory, 2008, vol. 16, Issue 3, pp. 183-200.
Hoffmann, U., et al., "Threshold electrotonus measurements in the diagnosis and follow up of ALS patients", Electroencephalography and Clinical Neurophysiology, 1996, 99:4, pp. 348-349. Abstract only.
Hoogendijk, W.I., et al., "Image analyser-assisted morphometry of the locus coeruleus in Alzheimer's disease, Parkinson's disease and amyotrophic lateral sclerosis", Brain, 1995, vol. 118(part 1), pp. 131-143.
Hyer, R., "Iraq and Afghanistan Producing New Pattern of Extremity War Injuries", Medscape Medical News, Mar. 27, 2006, 4 pgs.
Inglis, E.A., et al., "Usable technology? Challenges in designing a memory aid with current electronic devices, Neuropsychological Rehabilitation, 2004, vol. 14, Issue 1-2.
Jaffee, MD, M.S., et al., "Acute clinical care and care coordination for traumatic brain injury within Department of Defense", Journal of Rehabilitation Research & Development, 2000, vol. 46, pp. 655-666.
Jenkins, K., et al., "Reminiscence and acquired brain injury", Social Care and Neurodisability, 2010, vol. 1, Issue 2, pp. 14-21. Abstract only.
Johnson, E.O., et al., "Mechanisms of Stress: A Dynamic Overview of Hormonal and Behavioral Homeostasis", Neurosci Biohav Rev, 1992, vol. 16, pp.115-130.
Karlamangla, A.S., et al., "Allostatic load as a predictor of functional decline. MacArthur studies of successful aging", J Clin Epidemiol, 2002, vol. 55, pp. 696-710.
Kasl-Godley, J. et al., "Psychosocial Interventions for Individuals With Dementia: An Integration of Theory, Therapy, and A Clinical Understanding of Dementia", Clinical psychology Review, 2000, vol. 20, No. 6, pp. 755-782.
Kiernat, J., "The use of life review activity with confused nursing home residents", Am J Occup Ther, May 1979, vol. 33, No. 5, pp. 306-10. Abstract only.
Lew, H.L., et al., "Auditory and visual impairments in patients with blast-related traumatic brain injury: effect of dual sensory impairment on functional independence measure", J. Rehabil. Res. Dev., 2009, vol. 46, pp. 819-826.
Luthar, S.S., et al., "The Construct of Resilience: A Critical Evaluation and.Guidelines for Future Work", Child Development, 2000, vol. 71, Issue 3, pp. 543-562.
Manne, S.L., et al., "Spouse support, coping, and mood among individuals with cancer", Ann Behav Med, 1999, vol. 21, pp. 111-21.
Matthews, K.L., et al., "Noradrenergic changes, aggressive behavior, and cognition in patients with dementia", Biol Psychiatry, 2002, vol. 51, pp. 407-416.
McPherson, A., et al., "Effects of individualized memory aids on the conversation of persons with severe dementia: A pilot study" Aging & Mental Health, vol. 5, Issue 3, 2001, pp. 289-294.
Medicare Payment Advisory Commission (MedPAC) report letter to the U.S. Senate regarding access to outpatient physical therapy (PT) services and comprehensive rehabilitation facility services, Dec. 30, 2004, 15 pgs.
Michalak, E.E., et al., "Seasonality, negative life events, and social support in a community sample", Br J Psychiatry, 2003, vol. 182, pp. 434-438.
Miller, G.E., et al., "If It Goes Up, Must It Come Down? Chronic Stress and The Hypothalamic-Pituitary-Adrenocortical Axis in Humans", Psychological Bulletin, Jan. 2007, vol. 133(1), pp. 25-45.
Mitchell, S.L., et al., "A National Study of the Location of Death for Older Persons With Dementia", J Am Geriatr Soc, 2005, vol. 53, pp. 299-305.
Mohr, D.C., et al., "The relationship between social support, depression, and treatment for depression in people with multiple sclerosis", Psychol Med, 2004, vol. 34, pp. 533-541.
Moldover, J.E., et al., "Depression after traumatic brain injury: a review of evidence for clinical heterogeneity", Neuropsychol Rev., 2004; vol. 14, pp. 143-154.
Mooney, G., et al., "Factors related to recovery after mild traumatic brain injury",.Brain Inj., 2005; vol. 19, pp. 975-987, Abstract only.
Morriss, Esq., W., Description of Pre-filing Tests, 2015, 9 pgs.
Neumann, I.D., "Involvement of the brain oxytocin system in stress coping: interactions with the hypothalamo-pituitaryadrenal axis", Prog. Brain Res., 2002, vol. 139, pp. 147-162.
Newman, R., "APA's Resilience Initiative", Professional Psychology: Research and Practice, 2005, Vil. 36, No. 3, 227-229, 3 pgs.
Okie, S., MD., "Traumatic Brain Injury in the War Zone", N Engl J Med, 2005, vol. 352, pp. 2043-2047.
Oxman, T.E., et al., "Social Support and Treatment Response in Older Depressed Primary Care Patients", J Gerontol B Psychol Sci Soc Sci, 2001, vol. 56, pp. P35-P45.
Parks, R.W. et al., *Neuropsychology of Alzheimer's Disease and Other Dementias*, Oxford University Press (hardcover) 1993, Bibliography only.
Paykel, E.S. "Life events, social support and depression", Acta Psychiatr Scand Suppl., 1994, vol. 377, pp. 50-58.
Perlesz, a., et al., "Psychological distress and family satisfaction following traumatic brain injury: injured individuals and their primary, secondary, and tertiary careers", J Head Trauma Rehabil, 2000, vol. 15, Issue3, pp. 909-929.
Pittiglio, L,, MSN, RN, "Use of Reminiscence Therapy in Patients With Alzheimer's Disease", Lippincott's Case Management, 2000, Vo, 5, No. 6, pp. 216-220.

(56) References Cited

OTHER PUBLICATIONS

Plassman, B.L., et al., "Prevalence of Dementia in the United States: The Aging, Demographics, and Memory Study", Neuroepidemiology, Nov. 2007, vol. 29, No. 1-2, pp. 125-132.
Prigatano, G.P., "A history of cognitive rehabilitation" from *The Effectiveness of Rehabilitation for Cognitive Deficits*, P.W. Halligan and D.T. Wade, eds., 2005, New York: Oxford University Press, pp. 3-11, Abstract only.
Reese, E., et al., "The development of collective remembering", Memory, 2008, vol.16, Issue 3, pp. 201-212.
Resick, P.A., *Stress and Trauma*. New York, NY: Psychology Press; 2001
"Returning Home from Iraq and Afghanistan: Preliminary Assessment of Readjustment Needs of Veterans, Service Members, and Their Families", Institute of Medicine of the.National Academies, Washington, D.C.: The National Academies Press, 2010, 197 pgs.
Revenson, T.A., et al., "Social Support As a Double-Edged Sword: The Relation of Positive and Problematic Support to Depression Among Rheumatoid Arthritis Patients", Soc Sci Med, 1991, vol. 33, pp. 807-813.
Russ, J. C., *Fractal Surfaces*, 1994, Plenum Press, New York.
Sandberg, M. A., et al., "Beyond Diagnosis: Understanding the healthcare challenges of injured veterans through the application of the International Classification of Functioning, Disability and Health", The Clinical Neuropsychologist, 2009, vol. 23, Issue 8.
Sarne-Fleischmann, V., et al., "Development and evaluation of a personalised multimedia Alzheimer's patients", International Journal of Social and Humanistic Computing, 2008, vol. 1, No. 1.
Sayal, K., et al., "Effects of social support during weekend leave on cortisol and.depression ratings: A pilot study", J Affect Dis, 2002, vol. 71, pp, 153-157.
Sayer, N. A., et al., "Rehabilitation Needs of Combat-Injured Service Members Admitted to the VA Polytrauma Rehabilitation Centers: The Role of PM&R in the Care of Wounded Warriors", PM&R, Jan. 2009, vol. 1, Issue 1, pp. 23-28.
Schacter, D., "Implicit Memory: History and Current Status", Journal of Experimental Psychology Learning, Memory, and Cognition, 1987, vol. 13, No. 3, pp. 501-518.
Schwarzbold, M., et al., "Psychiatric disorders and traumatic brain injury", Neuropsychiatr Dis Treat, 2008, vol. 4, Issue 4, pp. 797-816.
Silver, J.M., et al., "The association between head injuries and psychiatric disorders: findings from the New Haven NIMH Epidemiologic Catchment Area Study", Brain Inj. 2001.
Sitzer, D.I. et al., "Cognitive training in Alzheimer's disease: a meta-analysis of the.literature", Acta Psychiatrica Scandinavica, 2006, vol. 114, Issue 2, pp. 75-90.
Smith, S.M., et al., "The role of the hypothalamic-pituitary-adrenal axis in.neuroendocrine responses to stress", Dialogues Clin Neurosci, 2006, vol. 8(4), pp. 383-395.
Sohlberg, M.M., et al., "Evidence-Based Practice for the Use of External Aids as a Memory Rehabilitation Technique", Journal of Medical Speech Pathology, 2007, 15:1, pp. XV-LI.
Stansfeld, S.A., et al., "Work and psychiatric disorder in the whitehall II study", J.Psychosom Res, 1997, vol. 43, pp. 73-81.
Steptoe, A., et al., "Loneliness and neuroendocrine, cardiovascular, and inflammatory stress responses in middle-aged men and women", Psychoneuroendocrinology, 2004, vol. 29, pp. 593-611.
Subramaniam, P., et al., "The impact of individual reminiscence therapy for people with dementia: Systematic review", Expert Review of Neurotherapeutics, 2012, vol. 12, No. 5, pp. 545-555.
Terrio, H., et al., "Traumatic brain injury screening: preliminary findings in a US Army Brigade Combat Team", J. Head Trauma Rehabil, 2009, vol. 24, pp. 14-23.
The hypothalamic-pituitary-adrenal (HPA) axis courtesy of CNSforum, 2001, 2 pgs.
Topo, P., et al., eds. "Enabling Technologies for People with Dementia" Report of Picture Gramophone assessment: National findings from Finland, Ireland, Norway and UK and cross national results, Oct. 5, 2004.
Travis, L.A., et al., "Social support, depression, and functional disability in older.adult primary-care patients", Am J Geriatr Psychiatry, 2004, vol. 12, pp. 265-71.
Tugade, M. M., et al. "Psychological Resilience and Positive Emotional Granularity: Examining the Benefits of Positive Emotions on Coping and Health", Journal of Personality, 2004, vol. 72, Issue 6, pp. 1161-1190.
Turner, B., et al., "A qualitative study of the transition from hospital to home for.individuals with acquired brain injury and their family caregivers", Brain Inj., 2007, vol. 21, Issue 11, pp. 1119-1130.
Turner, B., et al., "Perceptions of recovery during the early transition phase from hospital to home following acquired brain injury: a journey of discovery", Neuropsychological Rehabilitation, 2011, vol. 21, Issue 1, pp. 64-91.
Turner, B., et al., "Profiling early outcomes during the transition from hospital to home after brain injury", Brain Injury, 2009, vol. 23, Issue 1, pp. 51-60.
Turner, B.J., et al., "Perceived service and support needs during transition from hospital to home following acquired brain injury", Disability and Rehabilitation, 2011 vol. 33, Issue 10, pp. 818-829.
Turner, B.J., et al., "The transition from hospital to home for individuals with acquired brain injury: a literature review and research recommendations", Disabil Rehabil, 2008, vol. 30, Issue 16, pp. 1153-1176.
U.S. Department of Health and Human Services, National Plan to Address Alzheimer's Disease, May, 2012.
Uchino, B.N., et al., "The relationship between social support and physiological processes: a review with emphasis on underlying mechanisms and implications for health", Psychol Bull, 1996, vol. 119, pp. 488-531.
Ungar, M., "Resilience across Cultures", British Journal of Social Work, 2008, vol.38, Issue 2, pp. 218-235.
Vos, P.E., et al., "Mild traumatic brain injury", European Journal of Neurology, 2012,.vol. 19, pp. 191-198. doi: 10.1110.1468-1331. 2011.03581.x.
Weldon, M.S., et al. "Collective Memory: Collaborative and Individual Processes in Remembering", Journal of Experimental Psychology: Learning, Memory, and Cognition 1997, vol. 23, No. 5, pp. 1160-1175.
Winstanley, J., et al., "Early indicators and contributors to psychological distress in relatives during rehabilitation following severe traumatic brain injury: findings from the Brain Injury Outcomes Study", J Head Trauma Rehabil, 2006, vol. 21, Issue 6, pp. 453-466.
Woods, B., "Management of memory impairment in older people with dementia", International Review of Psychiatry, vol. 6, Issue 2-3, 1994, pp. 153-161.
World Health Organization: World Health Report 2003—Shaping the future. WHO; Geneva: 2003, 204 pgs.
Yehuda, R. "Current status of cortisol findings in posttraumatic stress disorder", Psychiatr Clin N Am, 2002, vol. 25, pp. 341-368.
Zaloshnja, E., et al., "Prevalence of Long-Term Disability From Traumatic Brain Injury in the Civilian Population of the United States, 2005", Journal of Head Trauma Rehabilitation (2008): Nov./Dec. 2008, vol. 23, Issue 6, pp. 394-400.
Zatzick, D., et al., "A National US Study of Posttraumatic Stress Disorder, Depression, and Work and Functional Outcomes After Hospitalization for Traumatic Injury", Annals of Surgery, 2008, vol. 248, Issue 3, pp. 429-437.

\* cited by examiner

# PERSONALIZED MEMORY COMPILATION FOR MEMBERS OF A GROUP AND COLLABORATIVE METHOD TO BUILD A MEMORY COMPILATION

CROSS-REFERENCE TO RELATED APPLICATION

The application claims priority from U.S. Provisional Patent Application No. 61/447,899, filed on Mar. 1, 2011, the contents of which are incorporated herein by reference.

BACKGROUND OF THE INVENTION

The present invention relates generally to creation and/or publishing of personalized memory compilations for members of a group and, more particularly, to a method for gathering, enriching, preserving, and sharing memories for members of a group using the combination of 1) collaboration through nominal group recall and 2) recording of personal preferences to produce a digital or printed asset that contains a blend of selected profiles, images, stories, personalized notes, and other relevant content from more than one group member and constitutes rendering of an important experience of the group.

Life's most meaningful events are often shared experiences with a group of family or friends. Participants have a strong desire to preserve and share the memories of these milestone occasions, as evidenced by the more than 50 billion digital photos taken last year; an increase of about 10 billion over just a few years ago.

The success of online social networks demonstrates that people want to preserve and share their stories in their own special way. They often care what others think, demonstrate a strong desire for personalization and employ technology with ease.

Many consumers demand personalized interaction. With the advent of high speed, high quality, digital print engines and software that can integrate fixed and variable content, variable data communication (VDC)—also called cross media communication—represents a major shift in technology and strategy to provide highly relevant, one-to-one communication with customers. Cross media communication represents advanced techniques and supporting technology that helps producers and marketers keep pace with customers' expectations regarding media. Many consumers demand personalized interaction. VDC enhances the value of communication by making the level and depth of conversation personal and powerful. Although measures of return on investment vary according to the selected media, response rates for VDC are often much higher than static media.

This major shift in technology has served to stimulate a high-growth market for custom photo books. On-demand publishers allow authors or photographers to print factory-bound, hard and soft cover books from a digital source for a low price. Consumers upload their photos and descriptions, and then print as many or as few books as they want. From a time and cost-saving perspective, these services have become useful for people who used to create their own photo albums and scrap books. Now they can save money by not printing individual photographs or purchasing albums and scrapbooking materials. Still, with photo book providers' current offerings, creating a unique photo book for more than one member of a group requires an extensive commitment of time, energy, and money.

The present invention addresses the challenge of collecting images and stories from a group of people, then assembling them as a personalized memory compilation in a way that preserves memories by: gathering and blending stories; images and other associated content from members of a group; creating a series of custom memory compilations where each one may be distinct and personalized to the group member; and replicating the process for a number of groups simultaneously.

SUMMARY OF THE INVENTION

In one aspect of the present invention, a method of generating a memory compilation, such as an album, comprises providing a plurality of digitally encoded images, text and/or other data; analyzing visual data within one of the provided images; determining a characteristic of at least one of the provided images; selecting a plurality of the provided images; arranging the provided Images, text, and data to generate a memory compilation; wherein at least one of the selecting or the arranging steps may be performed in response to the determined characteristic.

In another aspect of the present invention, a method of generating a memory compilation comprises: providing a plurality of digitally encoded images, text and/or other data; providing an external format of the memory compilation; selecting one or more of the provided images, text and/or other data; arranging the selected content, by a processor, according to the external format of the memory compilation. The method may include steps of selecting output options in a variety of media that may include digital forms and full-color printed compilations, such as books.

In a further aspect of the present invention, a method of generating a memory compilation, comprises a network connector, adapted to receive data from a computer network; an image store, which receives and stores a plurality of digitally encoded images from the computer network; an image analyzer, which analyzes the visual data of at least some of the images; and an image arranger which generates an arrangement of images, for an album, for at least some of the plurality of images, responsive to the analysis.

Another aspect of this invention may include a text analyzer, which analyzes text data; and a text arranger which generates an arrangement of text for at least some of the text content, responsive to the analysis; and implements a method for selecting output options.

As used herein, the term "memory compilation" or "memory book" should be considered not in the limiting fashion of a tangible book, but in the sense of a collection of media, such as images, text, video, audio, or other media in a set, such as an album. A group memory book may be understood as a compilation of memories elicited from a group. Although a school yearbook is described herein as one example of a memory compilation, any description of a yearbook should be understood as merely one example of many different embodiments of the present invention. Yearbooks have been available for decades, and nearly every school produces one. But continually declining sales in the yearbook industry reflect their decreasing relevance for students. Over time, in an effort to guarantee the inclusion of every student, team, and group, many yearbooks have come to mean less to individuals and more to the collective. They now serve primarily an institutional purpose—representing the institution at a particular point in time rather than the participants. Recognizing the customization trend, the yearbook industry has begun to offer modest customization options. Since most manufacturers rely on less expensive but less flexible offset printing, the custom options are limited to printing and embossing on the cover or a digitally printed insert of just a few pages. While these options have temporarily boosted the faltering sales of yearbooks, they generally lack the customization and personalization young people have come to expect and demand. Yearbooks contain the exact same school information for each student. There is limited personalization or customization and each student receives the same content. The present invention may contain a large portion of personalized and customized information, information completely unique to that student. There may be portions of the compilation that are the same (e.g., teacher profiles, administrator profiles, coach profiles, school profiles), but one of the aspects that makes the present invention unique is that each student will receive a compilation that is highly personalized.

The content provided by each user is enriched by the output produced through the process. Participants find new information about the shared experience (information shared among others they selected for inclusion in their compilation, but about which they were not previously aware) which may change the way their memories are perceived and later recalled.

One embodiment of the present invention may comprise a memory compilation for students (middle school, high school, college, university and the like); a full color, digital or printed, version of a collection of student and faculty profiles married with other school content and personalized content to create a unique and individualized keepsake that may be printed as a group photo book to commemorate the school year or graduation. Variable data composition may be performed to allow each compilation to contain unique information for each student, teacher, coach, or administrator. Each compilation may be tailored to a particular participant. The invention may feature the collecting of data and information specific to a participant (e.g., a letter from his/her parents, a personal thank-you note from the student to their parents, unique comments, and photos sent by school friends, teachers, administrators, and/or coaches).

Another embodiment of the present invention may comprise a memory compilation for sports teams; a full color, digital or printed, version of a collection of player, coach and officials' profiles married with other team content and personalized content to create a unique and individualized compilation that may be printed as a group photo book to commemorate the sports season. Variable data composition may be performed to allow each compilation to contain unique information for each player, coach, and/or official. Each compilation may be tailored to a particular participant. The invention may comprise the collection of data and information specific to a participant. (e.g., a letter from his/her parents or coach, a personal thank-you note from the player to parents, coach or others, unique comments and photos sent by other players, coaches, family members, friends, or members of other teams).

The invention may further entail a method for creating a story by multiple collaborators supplying content associated with a story concept that comprises; receiving a concept for a story, the story concept including an indication of one or more editors that are selected to edit the story by an originator of the story concept, determining whether the story concept includes content that meets a predetermined criteria set by a party separate from the multiple collaborators and excluding the story concept if the concept fails to meet the predetermined criteria, making the story concept available for online access to enable the multiple collaborators to submit story content related to elements in the story concept, accepting the received story content associated with the story concept from the multiple collaborators if the received story content meets the predetermined criteria, accepting related story content such as comments or votes received through a wide area network connection from one or more editors and at least one of the multiple collaborators, creating a personalized story for each participant by including story content selected from one or more collaborators based on the participant's expressed preferences, and providing output options in a variety of media that may include digital forms and full color printed books or types of compilations.

The invention may further entail a method for creating a story by multiple collaborators supplying content associated with a story concept that comprises; receiving a story concept for a story, the story concept including an indication of one or more editors that are selected to edit the story by an originator of the story concept, determining whether the story concept includes content that meets a predetermined criteria set by a party separate from the multiple collaborators and deleting the story concept if the concept fans to meet the predetermined criteria, making the story concept available for online access to enable the multiple collaborators to submit competing story content related to elements in the story concept, accepting the received competing story content associated with the story concept from the multiple collaborators if the received competing story content meets the predetermined criteria, determining selected story content from the accepted competing story content submitted from each of the multiple collaborators that is approved for inclusion in the story based on votes received through a wide area network connection from the one or more editors and at least one of the multiple collaborators, creating the story from the selected story content that is approved, and deleting the accepted competing story content if the received votes have failed to approve the content.

The present invention may provide a collaborative method to capture and preserve the memories of group members and present the memories in a keepsake memento, such as a memory compilation.

These and other aspects, objects, features, and advantages of the present invention, are specifically set forth in, or will become apparent from, the following detailed description of an exemplary embodiment of the invention when read in conjunction with the accompanying drawings.

DETAILED DESCRIPTION OF THE INVENTION

Figure 1:
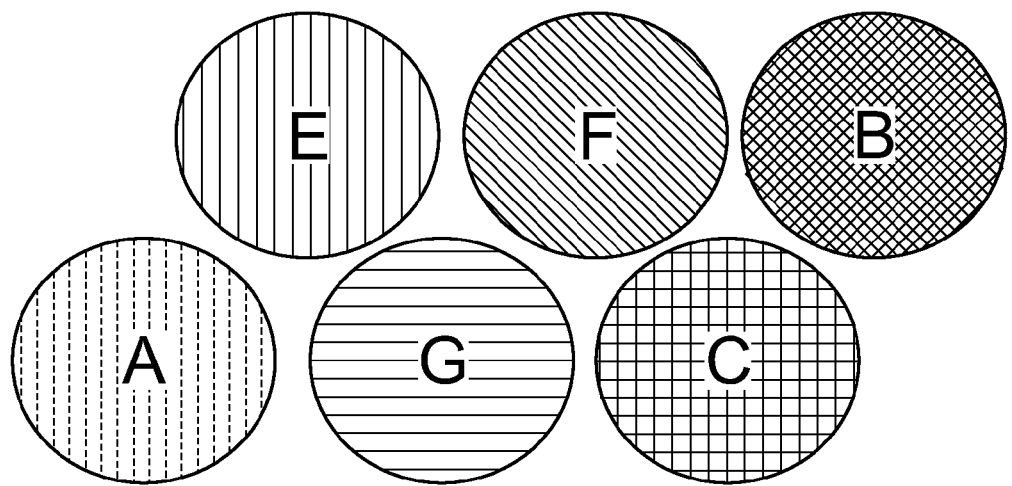
FIG. 1 is a plan diagram of group members sharing information separately, according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

One area of memory research has been on the effect of collaboration among group members on individual and collective memory. The goal has been to gain a better understanding of the costs and benefits of collaboration and how individual memory constrains and contributes to group memory. Also, research has shown how groups shape individual memory. Some findings include: remembering with others is different from remembering alone; collaborating increases confidence, completeness, and accuracy of recall; nominal group recall (the pooled sum of information remembered by individuals) produces more information than fully collaborative groups; group recall can influence subsequent memory of individuals, affecting accuracy and completeness; group recall leads some participants to new information, which can change the way their memories are perceived and recalled; and relationships among group members affect how much, and how well, each member remembers.

One option for understanding these and other findings is using complex systems theory. Complex systems are composed of interconnected parts that as a whole exhibit one or more properties that are not obvious based on the properties of the individual parts. Complex systems theory is focused on analyzing organized but unpredictable behaviors of complex systems found in nature. Some of the characteristics of complex systems include self-organization, non-linearity, order/chaos dynamism, and emergent properties.

In complex systems, change occurs naturally and automatically in order to increase efficiency and effectiveness. This change, self-organization, is accomplished by the elements that make up the system responding to feedback from the system's environment regarding efficiency and effectiveness. Linear change is where a sequence of events affects each event in the order in which they appear. In contrast, non-linearity means that elements changed by previous elements can also affect the elements that preceded the immediately preceding elements.

In system development, with strong knowledge of the early stages, it can be fairly easy to predict a range of possibilities for the next stage. But farther down the development sequence, it is far more difficult to predict based only on knowledge of the first stage. Even when knowledge of the system is extensive, and even though there is logical development from stage to stage, predicting developments farther down the sequence can be increasingly difficult. This uncertainty of predictability is called "chaos."

The unpredictability that is inherent in the natural evolution of complex systems can yield results that are totally unpredictable based on knowledge of the original conditions. Such unpredictable results are called emergent properties. Emergent properties are still a logical result, just not a predictable result.

In such complex adaptive systems, networks of interacting individuals create an operating history that weaves together a story. Once the narrative coalesces, knowledge of it by the components of the system can influence individual behavior. Thus, the recall of group memories by group members can be viewed as an evolving dynamical system with group properties that emerge from the interactions among the participants, and between the participants and the group.

The fractal function, $Z_{n+1}=Z_n^2+C$, represents the group recall of a shared experience among three participants, E, F and G. C represents a catalyst that precipitates the interaction and consequent memory recall. The first iteration ($Z_1=E$) comes from the first participant E's contribution to the group recall, which consists entirely of explicit memory, those memories recalled directly by the participant.

For the second iteration of the equation ($Z_2=Z_1*F+C$), the inputs are 1) the second participant F's contribution, also consisting of explicit memory; and 2) the output from the previous function ($Z_1$). The output this time ($Z_2$) is a compound of the explicit memory contributed by each individual, including that portion of each participant's explicit memory that intersects with others in the group (those group memories they share).

For the third iteration, and every one thereafter, the participant (in this case, G) again contributes explicit memory, and the output ($Z_3=Z_2*G+C$) is the iterated aggregation of all previously contributed explicit memory.

The fractal function continues to iterate for as many participants as required and allows for an unlimited number of participants/iterations.

Referring now to the drawings in detail, wherein like reference characters refer to like elements, there is shown in FIG. 1 a plan diagram of group members' memories A, B, C, E, F, and G (in no particular sequence) sharing information separately. FIG. 1 may be considered to be a Venn diagram containing a set of elements representing the explicit memory provided by each group member. Items A, B, C, E, F, and G represent the memories of the respective group members. Each member's separate sharing of their respective memories with the group is termed nominal group recall.

Figure 2:
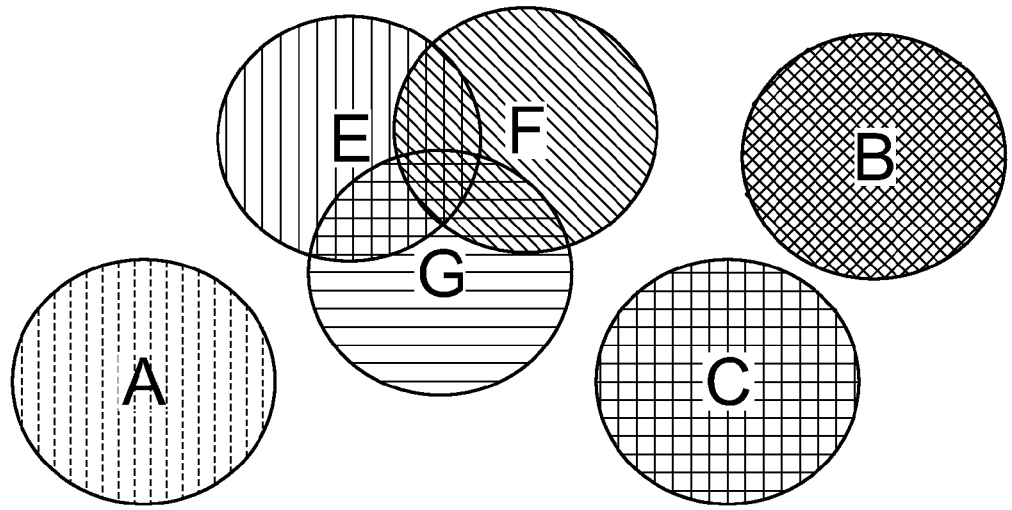
FIG. 2 is a plan diagram of group members' memories selectively including information among selected group members, according to an embodiment of the present invention.
Figure 3:
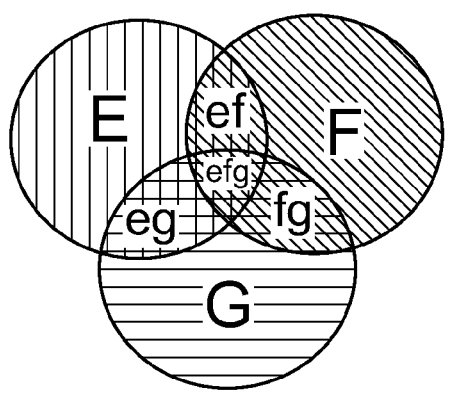
FIG. 3 is a plan diagram of selected group members collaboratively sharing information, according to an embodiment of the present invention.

Selective inclusion is shown in FIG. 2, wherein, for example, group members E, F, and G selectively include memories while not necessarily including memories from, for example, group members A, B, and C. The selected group members E, F, and G are shown in FIG. 3 collaboratively sharing information, such as memories. Collaborative memory exists within the intersection of memories shared among the selected group members E, F, and G. The Venn diagram in FIG. 3 represents the collaborative memory of selectively included group members E, F, and G according to an embodiment of the present invention. The union set of all memories provided by selectively included group members E, F, and G, contains shared memories, such as the intersection set of explicit memories from selectively included group members E, F, and G.

In the situation shown in FIG. 3, intersectional area ef may represent intersecting or shared memories shared between members E and F. Likewise, intersectional area eg may represent intersecting or shared memories shared between members E and G. Regarding members F and G, intersectional area fg may represent intersecting or share memories shared between members F and G. Intersectional area efg may represent intersecting or shared memories shared among members E, F, and G.

The information or other type of content (such as memories) provided by each member may be enhanced by the collaborative output produced by the methods of the present invention. Group members may discover new information about a shared experience for which one or more selected members may have been unaware, remembered differently, experienced from another perspective; or otherwise have non-identical information.

Figure 4:
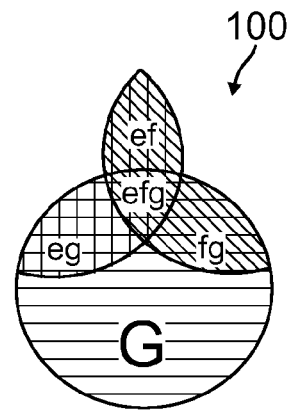
FIG. 4 is a plan diagram of an isolated portion of FIG. 3, according to an embodiment of the present invention.

Enhanced memory input may be seen in FIG. 4, which shows an isolated portion of FIG. 3, namely the information 100 available to member G, comprising intersectional information shared with member E (eg), intersectional information shared with member f (fg), intersectional information shared with members E and F (efg) plus intersectional information not originally possessed by G, but shared between members E and F (ef). The information quality available to member G is enhanced by the collaboration between members E and F. In one aspect, this could result in enhancement of member G's memory of an experience shared among members E, F, and G. Conceptually, the area of the circle representing member G's memory is enlarged by the additional portion ef added to the sum or memory originally shown for member G in FIG. 1 before the collaboration and enhancement of information.

Continuing with FIG. 4, each group member's memory now includes the collaborative memory (eg, fg, and efg) described in FIG. 3 as well as a latent memory (ef) elicited through the process of collaborative recall. The latent memory of includes information shared by others (such as E and F) in the recall process about which the present member (G) was not previously aware.

Figure 5:
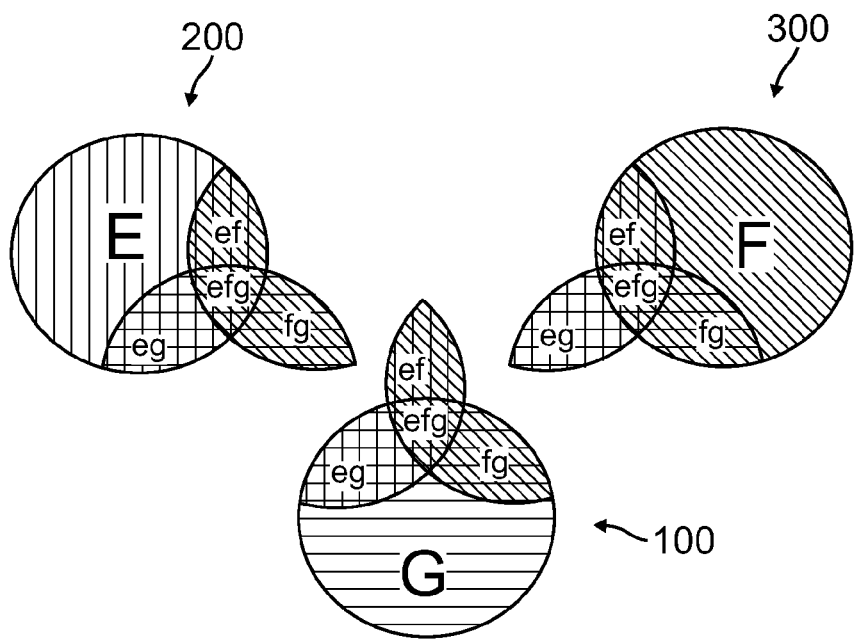
FIG. 5 is a plan diagram of group members from FIG. 3, with retained enhanced memories, according to an embodiment of the present invention.

As shown in FIG. 5 group members E and F may also retain enhanced memories, such as described above regarding member G in FIG. 4. The information 200 available to member E may be enhanced for producing output for the benefit of member E, while the information 300 available to member F may be enhanced for producing output for the benefit of member F. As demonstrated in the description and drawings referenced above, nominal group recall from FIG. 1 can proceed to selective inclusion in FIG. 2, collaboration in FIG. 3 to elicit latent memory, and producing an enhanced memory.

It should be understood that the above-mentioned group members A, B, C, although not described expressly as sharing memories with members E. F, and G, the above methods may occur among members A, B, C, or other members in parallel with the described interaction involving members E, F, and G, whether simultaneously, subsequently, prior to, or in any feasible sequence. Essentially, it is to be understood that the above examples are not limiting, especially as to the extent of interaction among group members or members of various sub-groups.

The ultimate output is a combination of all contributed explicit memory plus an emergent memory called latent memory.

Latent memory is not explicit memory, but is an emergent function of group recall. It comes into being only after participants share their explicit memories. As participants find new information about the shared experience and others provide information, about which individual participants may not recall or about which the individual participants were not previously aware. Represented graphically, latent memory lies at the intersection of two or more participant's explicit memory.

The significance of latent memory to the task of preserving memories comes from the capacity to alter how explicit memory is both perceived, and later, recalled. To preserve the most complete and accurate recollection of a shared event, the emergence of latent memory must be carefully managed. If explicit memories are combined too soon in the preservation process, then the development of latent memory may alter participants' recollection. Furthermore, because group recall has non-linear properties, the emergence of latent memory has the potential to permanently change more than one group member's recollection; an outcome potentially deleterious to an accuracy goal.

As group recall takes place, a collaborative memory $Z_{n+1}$, is constructed iteratively as each participant contributes explicit shared memory and a latent shared memory emerges. Using this iterative formula, we can demonstrate the synergistic nature of group recall by comparing the collaborative output to the collective sum of the participants' contributions. Mathematically, as long as catalyst C is positive, $a^2+2a$ bi+$b^2$+C will be greater than $a^2$. The corollary is, if catalyst C is sufficiently negative—in other words, there is sufficient noise or interference in the process—then $a^2+2a$ bi $b^2$+C could be less than $a^2$. In other words, if the process that catalyzes the iterative memory recall is not performed properly (a negative C value), the output could be deteriorated. Conversely, if that process is performed properly (a positive C value), it will produce synergy and symbiosis (i.e., a better memory).

Figure 6:
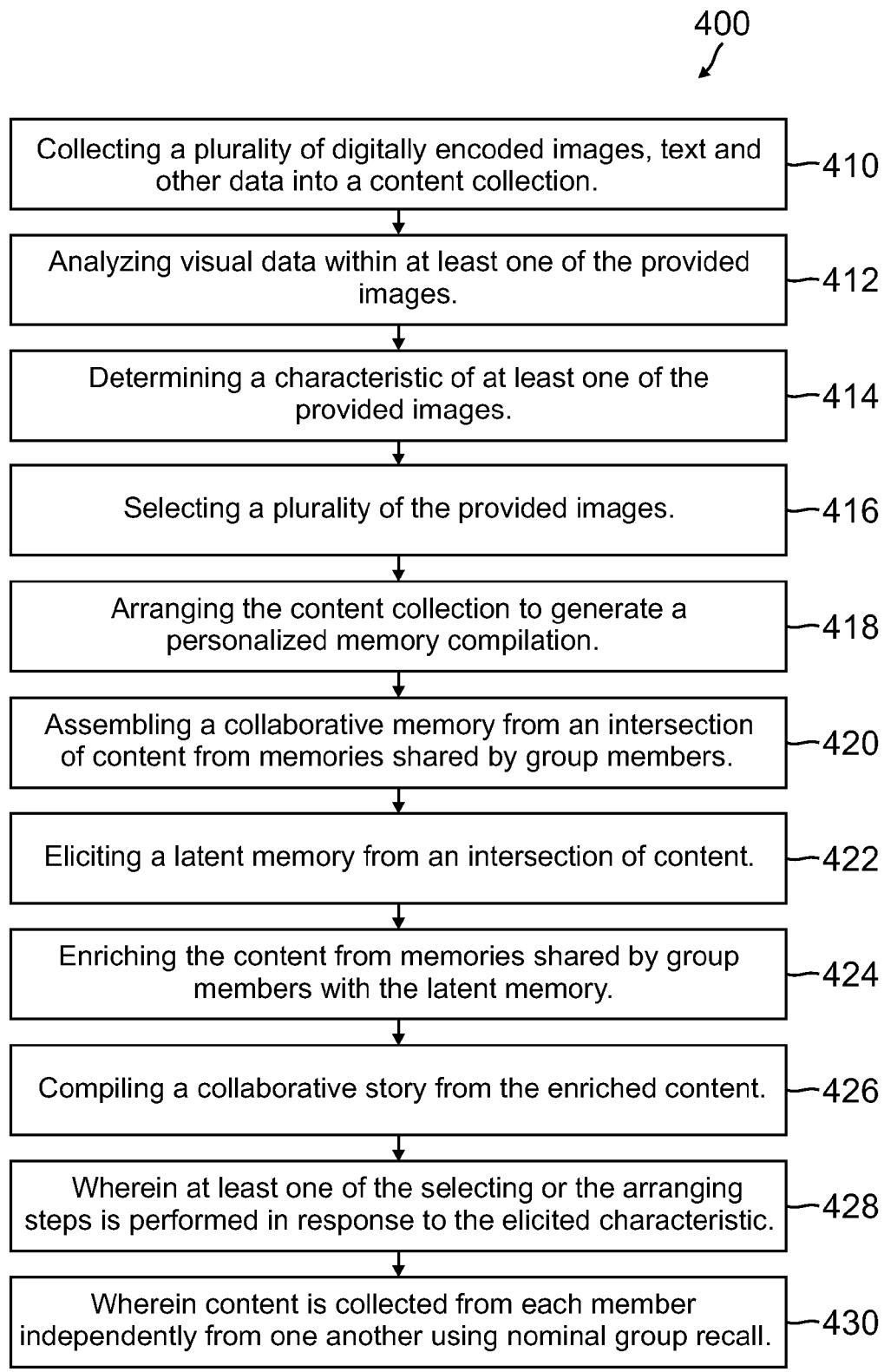
FIG. 6 is a flowchart of a method, according to another embodiment of the present invention.

Referring to FIG. 6, a method 400 of the present invention may include a Step 410 of collecting a plurality of digitally encoded images, text and other data into a content collection. Step 412 may comprise analyzing visual data within at least one of the provided images. Another step, Step 414 may include determining a characteristic of at least one of the provided images. A Step 416 may involve selecting a plurality of the provided images. Arranging the content collection to generate a personalized memory compilation comprises Step 418. Step 420 may also comprise assembling a collaborative memory from an intersection of content from memories shared by group members. A Step 422 may include eliciting a latent memory from an intersection of content. Step 424 may involve enriching the content from memories shared by group members with the latent memory. Another step, Step 426 comprises compiling a collaborative story from the enriched content. Yet another Step 428 comprises additionally performing the method 400 wherein at least one of the selecting or the arranging steps is performed in response to the elicited characteristic. Step 430 comprises performing the method 400 wherein content is collected from each member independently from one another using nominal group recall.

Figure 7:
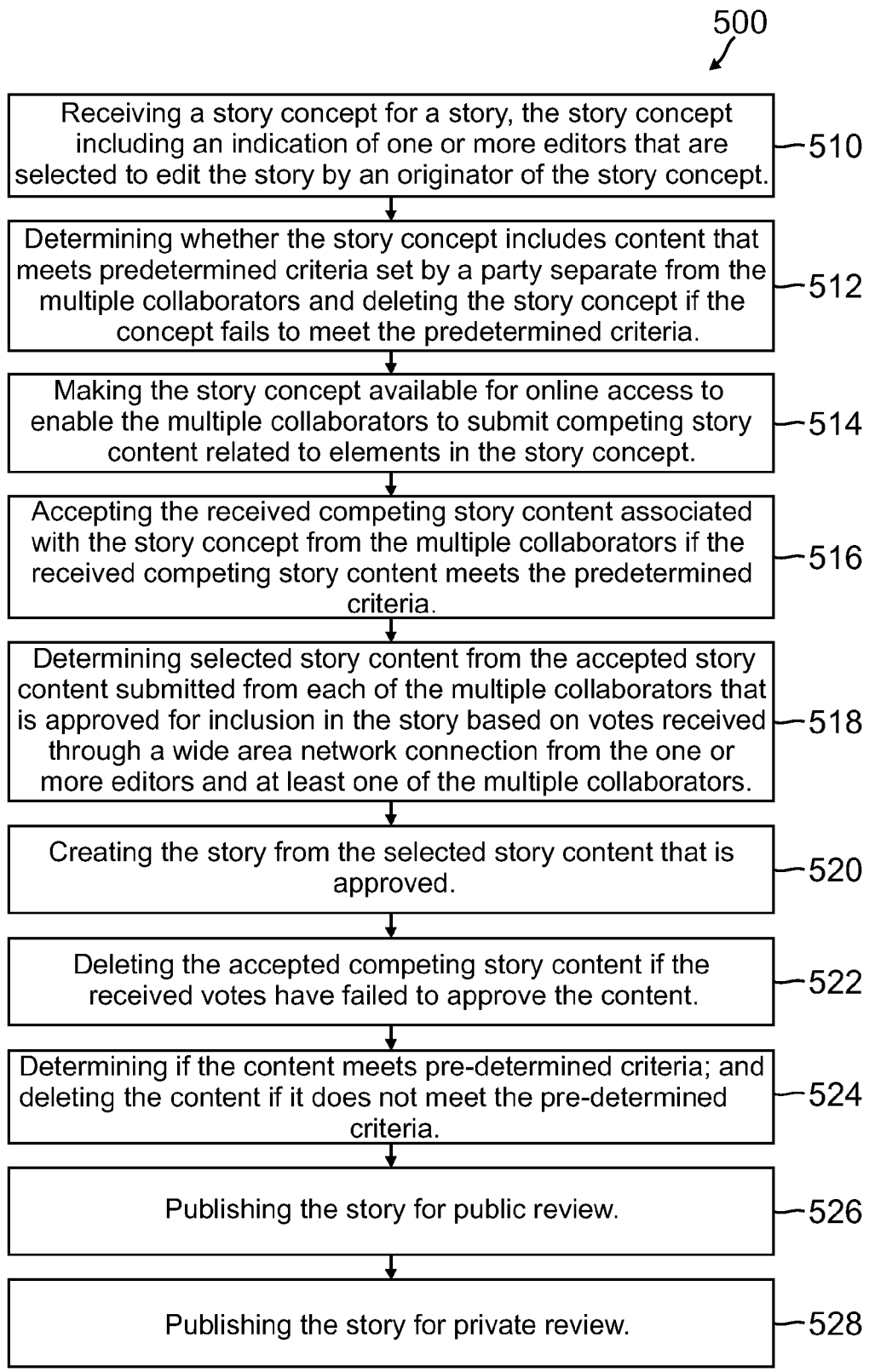
FIG. 7 is a flowchart of another method, according to another embodiment of the present invention.

Another method 500 is shown in the flowchart of FIG. 7. Step 510 comprises receiving a story concept for a story, the story concept including an indication of one or more editors that are selected to edit the story by an originator of the story concept. Another Step 512 may comprise determining whether the story concept includes content that meets predetermined criteria set by a party separate from the multiple collaborators and deleting the story concept if the concept fails to meet the predetermined criteria. Yet another Step 514 may include making the story concept available for online access to enable the multiple collaborators to submit competing story content related to elements in the story concept. An additional Step 516 may involve accepting the received competing story content associated with the story concept from the multiple collaborators if the received competing story content meets the predetermined criteria. A Step 518 may comprise determining selected story content from the accepted story content submitted from each of the multiple collaborators that is approved for inclusion in the story based on votes received through a wide area network connection from the one or more editors and at least one of the multiple collaborators. A Step 520 may include creating the story from the selected story content that is approved. Step 522 may comprise deleting the accepted competing story content if the received votes have failed to approve the content. Another step, Step 524 may include determining if the content meets pre-determined criteria; and deleting the content if it does not meet the pre-determined criteria. The method 500 optionally may include a Step 526 of publishing the story for public review and/or a Step 528 of publishing the story for private review.

Figure 8:
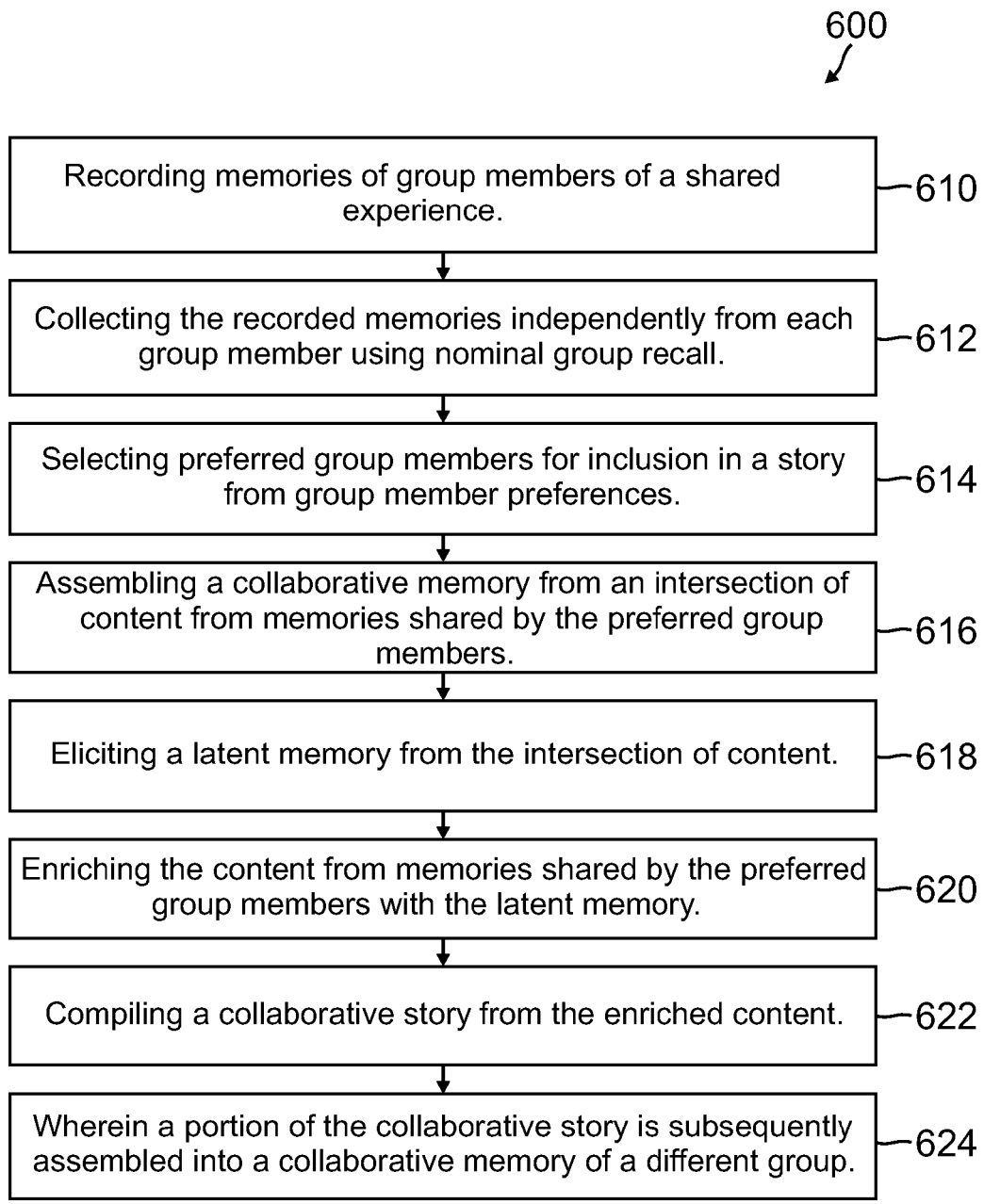
FIG. 8 is a flowchart of yet another method, according to another embodiment of the present invention.

In FIG. 8, another method 600 according to the present invention is displayed. A Step 610 may comprise recording memories of group members of a shared experience. Another Step 612 may involve collecting the recorded memories independently from each group member using nominal group recall. Yet another step, Step 614 may include selecting preferred group members for inclusion in a story from group member preferences. A Step 616 may comprise assembling a collaborative memory from an intersection of content from memories shared by the preferred group members. Another Step 618 may comprise eliciting a latent memory from the intersection of content. Yet another Step 620 may comprise enriching the content from memories shared by the preferred group members with the latent memory. Compiling a collaborative story from the enriched content may be practiced as a Step 622. The method 600 optionally comprises a Step 624 wherein a portion of the collaborative story is subsequently assembled into a collaborative memory of a different group.

One embodiment of the present invention may comprise a digitally composed version of a collection of group member profiles married with other group and personalized content that creates an individualized compilation that may be printed as a keepsake for a special occasion the group may be celebrating. The invention may feature the collecting of data and information specific and only intended for that participant. e.g., a letter from family or friends, a personal thank-you note from a participant, unique comments and photos sent by acquaintances, friends, or family.

An online application enables a first user to navigate to a web site, upload digital images, answer a series of variable questions, and combines those images with text or other related content in a stylized template to create a user-generated profile, which may be made available to members of the group for inclusion in a personalized compilation if selected by a second user. A memory compilation (such as a group memory book) may be a collection of images and text that are brought together by a stylized template that may be customized by the end user. A given story, profile, or combination of profiles may be made available on a web page at a given location (such as at a URL) that may be shared with other users, published to other web sires or web logs, or maintained exclusively for the user. The invention also provides for multiple end users to collaborate to create a "shared" story.

The present invention may contain a large portion of personalized and customized information unique to its owner. There may be portions of the compilation that are the same (e.g. group member profiles, group or organization information). One aspect of the present invention is that each group member may receive a compilation that is highly personalized.

The present invention may comprise content compiled by collecting and organizing information and data (textual, photographic and informational) submitted by group members (e.g. students, faculty, and coaches) on a website. The website may provide a social networking style user interface (UI) that provides a platform that manages group member collaboration through online interaction via a suite of web based tools designed to facilitate better communication, better interaction and better quality and volume of information and data.

Certain of said content may be provided by a pre-determined third user and assembled in a pre-programmed page template by combining a plurality of digital photos selected by the third user, each characterized by a portrait or landscape format and automatically rendered in the image areas of the selected page layout, within the limits of pre-programmed dimensions, based upon the constraints of a portrait or landscape format. The third user may provide written responses to multiple, pre-programmed, group-specific questions.

The method may be practiced wherein a first user selects from a pre-programmed list of other potential users, the electronic content of at least one second user's profile created according to any one or more preceding claims, for inclusion in the compilation.

The method may further comprise composing images, text and other content on a plurality of pages responsive to the arranging, printing and binding the pages together. The method may also continue with determining at least one characteristic of at least one of the images or text and arranging responsive to the at least one characteristic, optionally arranging responsive to the content of the images or text. Other options for the method include providing the images in a first order and arranging the images into a second order different from the first order; changing the size of an image; grouping the selected images into a plurality of groups, and wherein arranging the images comprises arranging the images responsive to the grouping; and/or arranging irrespective of an order of acquisition of the images.

In compiling memory compilations or other collaborations, users may choose to group together only certain portions of the data selected by the group. For example, if the group selects a total of eleven sections for a planned memory compilation, a user may elect to obtain only one or more sections of the eleven sections selected by the group. Also, a user may select sections not selected by the group.

It should be understood, of course, that the foregoing relates to exemplary embodiments of the invention and that modifications may be made without departing from the spirit and scope of the invention as set forth in the following claims. Furthermore, a method herein described may be performed in one or more sequences other than the sequence presented expressly herein.

We claim:

1. A method performed by a server system for automatically generating personalized memory compilations and eliciting latent memories, the method comprising:
   a) receiving information for a group, wherein the group has members and is defined based on a shared experience, and wherein the information for the group identifies the group members;
   b) after receiving the information identifying the group members, assembling a content collection through nominal group recall by, for each of a plurality of group members, independently performing a set of acts comprising:
      i) prompting that member to provide computer readable data items representing memories of that member which are relevant to the shared experience;
      ii) receiving, from that member, one or more computer readable data items representing memories of that member which are relevant to the shared experience;
      iii) storing the one or more computer readable data items received from that member in the content collection;
   c) selectively including data items representing an intersection of memories of different individuals in personalized memory compilations of the plurality of group members by, for each of the plurality of group members, performing a set of acts comprising the following acts with that member as subject member:
      i) receiving, from the subject member, memory enrichment information, wherein the memory enrichment information comprises information identifying other group members whose memories should be included in a personalized memory compilation for the subject member; and
      ii) generating the personalized memory compilation for the subject member, wherein the personalized memory compilation for the subject member comprises:

A) the computer readable data items stored in the content collection which represent memories of the subject member which are relevant to the shared experience; and B) the computer readable data items stored in the content collection which represent memories of other members identified as members whose memories should be included in the personalized memory compilation for the subject member; and d) eliciting latent memories from the plurality of group members through providing group members access to each others' memories in a controlled manner by, for each of the plurality of group members, providing that group member with the personalized memory compilation generated for that member, wherein providing group members access to each others' memories in a controlled manner comprises providing group members access to each others' memories after assembling the content collection through nominal group recall.

2. The method of claim 1, wherein the method comprises, for each of the plurality of group members, providing that group member a list of other individuals who could potentially submit computer readable data items which should be included in that group member's personalized memory compilation.

3. The method of claim 1, wherein:
a) the personalized memory compilation for a first group member from the plurality of group members comprises:
i) information from an individual who is not a member of the group which is specific to the first group member; and
ii) information from another group member which his specific to the first group member; and
b) the information which is specific to the first group member is included only in the first group member's personalized memory compilation.

4. The method of claim 1, wherein the personalized memory compilation for a first member from the plurality of group members excludes at least one set of computer readable data items which is included in personalized memory compilations for other group members.

5. The method of claim 4, wherein the group comprises a second group member in addition to the plurality of group members, and wherein the set of computer readable data items which is excluded from the personalized memory compilation of the first group member comprises data items submitted by the second member.

6. The method of claim 1, wherein, for each of the plurality of group members, the act of prompting that member to provide computer readable data items representing memories of that member which are relevant to the shared experience comprises providing that member with variable questions which are specific to the group defined based on the shared experience.

7. A machine comprising:
a) a plurality of user computers;
b) a computer network; and
c) a server system;
wherein:
A) the computer network is a wide area network to which both the server system and the server system are communicatively connected;

B) each user computer from the plurality of user computers is configured to allow a user of that user computer to, via the computer network, access a program hosted by the server system for automatically generating personalized memory compilations and eliciting latent memories;

C) the program hosted by the server system for automatically generating personalized memory compilations and eliciting latent memories comprises data operable to configure the server system to perform a set of acts comprising:
I) receiving information for a group, wherein the group has members and is defined based on a shared experience, and wherein the information for the group identifies the group members;
II) after receiving the information identifying the group members, assembling a content collection through nominal group recall by, for each of a plurality of group members who access the program, independently performing a set of acts comprising:
a) prompting that member to provide computer readable data items representing memories of that member which are relevant to the shared experience;
b) receiving, from that member, one or more computer readable data items representing memories of that member which are relevant to the shared experience;
c) storing the one or more computer readable data items received from that member in the content collection;
III) selectively including data items representing an intersection of memories of different individuals in personalized memory compilations of the plurality of group members who access the program by, for each of the plurality of group members who access the program, performing a set of acts comprising the following acts with that member as subject member:
a) receiving, from the subject member, memory enrichment information, wherein the memory enrichment information comprises information identifying other group members whose memories should be included in a personalized memory compilation for the subject member; and
b) generating the personalized memory compilation for the subject member, wherein the personalized memory compilation for the subject member comprises:
i) the computer readable data items stored in the content collection which represent memories of the subject member which are relevant to the shared experience; and
ii) the computer readable data items stored in the content collection which represent memories of other members identified as members whose memories should be included in the personalized memory compilation for the subject member; and
IV) eliciting latent memories through providing group members access to each others' memories in a controlled manner by, for each of the plurality of group members who access the program, providing that group member with the personalized memory compilation generated for that member, wherein providing group members access to each others' memories in a controlled manner comprises providing group members access to each others' memories after assembling the content collection through nominal group recall.

8. The machine of claim 7, wherein the set of acts the data comprised by the program hosted by the server system for automatically generating personalized memory compilations and eliciting latent memories is operable to configure the server system to perform comprises, for each of the plurality of group members who access the program, providing that group member a list of other individuals who could potentially submit computer readable data items which should be included in that group member's personalized memory compilation.

9. The machine of claim 7, wherein:
a) the plurality of group members who access the program comprises a first group member;
b) the act of generating the personalized memory compilation for the first member comprises generating a personalized memory compilation comprising:
   i) information from an individual who is not a member of the group which is specific to the first group member; and
   ii) information from another group member which his specific to the first group member; and
c) the information which is specific to the first group member is included only in the first group member's personalized memory compilation.

10. The machine of claim 7, wherein:
a) the plurality of group members who access the program comprises a first group member;
b) the act of generating the personalized memory compilation for the first member comprises generating a personalized memory compilation which excludes at least one set of computer readable data items which is included in personalized memory compilations for other group members who access the program.

11. The machine of claim 10, wherein the group comprises a second group member in addition to the plurality of group members who access the program, and wherein the set of computer readable data items which is excluded from the personalized memory compilation of the first group member comprises data items submitted by the second member.

12. The machine of claim 7, wherein, for each of the plurality of group members who access the program, the act of prompting that member to provide computer readable data items representing memories of that member which are relevant to the shared experience comprises providing that member with variable questions which are specific to the group defined based on the shared experience.

* * * * *

UNITED STATES PATENT AND TRADEMARK OFFICE
CERTIFICATE OF CORRECTION

| | |
|---|---|
| PATENT NO. | : 9,286,643 B2 |
| APPLICATION NO. | : 13/406530 |
| DATED | : March 15, 2016 |
| INVENTOR(S) | : Robert R. Reinders et al. |

Page 1 of 1

It is certified that error appears in the above-identified patent and that said Letters Patent is hereby corrected as shown below:

In the Claims

Column 13, Claim 9, line 20, reads "...ii) information from another group member which his..."; which should be deleted and replaced with "...ii) information from another group member which is..."

Signed and Sealed this
Twenty-fourth Day of May, 2016

Michelle K. Lee
*Director of the United States Patent and Trademark Office*